US 8,717,321 B2

May 6, 2014

(12) United States Patent
Kim (10) Patent No.: US 8,717,321 B2
(45) Date of Patent: May 6, 2014

(54) DISPLAY DEVICE INTEGRATED WITH TOUCH PANEL

(75) Inventor: Tae-Hwan Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 145 days.

(21) Appl. No.: 13/330,909

(22) Filed: Dec. 20, 2011

(65) Prior Publication Data

US 2013/0038542 A1  Feb. 14, 2013

(30) Foreign Application Priority Data

Aug. 11, 2011  (KR) .......................... 10-20110080355

(51) Int. Cl.
*G06F 3/041* (2006.01)

(52) U.S. Cl.
USPC ..... 345/173; 345/174; 178/18.01; 178/18.06; 349/12; 349/111

(58) Field of Classification Search
USPC .................... 345/173, 174; 178/18.01, 18.06; 349/12, 111, 138, 139, 153
See application file for complete search history.

(56) References Cited

U.S. PATENT DOCUMENTS

| | | | | |
|---|---|---|---|---|
| 2003/0067580 A1* | 4/2003 | Song et al. | .................... | 349/187 |
| 2007/0013819 A1* | 1/2007 | Pak et al. | ........................ | 349/12 |
| 2009/0096759 A1* | 4/2009 | Nishiwaki et al. | ............ | 345/173 |
| 2009/0244021 A1* | 10/2009 | Matsuo et al. | ................ | 345/173 |
| 2010/0007268 A1* | 1/2010 | Kim | ............................... | 313/504 |
| 2010/0134436 A1* | 6/2010 | Jeong et al. | .................... | 345/174 |
| 2010/0220071 A1* | 9/2010 | Nishihara et al. | ............. | 345/173 |
| 2010/0328228 A1* | 12/2010 | Elias | ............................. | 345/173 |
| 2011/0057893 A1* | 3/2011 | Kim et al. | ..................... | 345/173 |
| 2011/0128244 A1* | 6/2011 | Cho et al. | ...................... | 345/173 |
| 2011/0157084 A1* | 6/2011 | Huang et al. | .................. | 345/174 |
| 2011/0234507 A1* | 9/2011 | Chou et al. | .................... | 345/173 |
| 2011/0242020 A1* | 10/2011 | Kang et al. | .................... | 345/173 |
| 2011/0242057 A1* | 10/2011 | Lee et al. | ...................... | 345/176 |
| 2012/0105344 A1* | 5/2012 | Ko et al. | ........................ | 345/173 |
| 2012/0194441 A1* | 8/2012 | Frey | ................................ | 345/173 |
| 2012/0218219 A1* | 8/2012 | Rappoport et al. | ........... | 345/174 |

* cited by examiner

*Primary Examiner* — Koosha Sharifi-Tafreshi
(74) *Attorney, Agent, or Firm* — Morgan, Lewis & Bockius LLP (57) ABSTRACT

Disclosed is a display device integrated with a touch screen in which resistance is reduced by forming a narrow bezel or increasing a routing margin through structure change of the outer portion of a sensing area in a structure in which a touch sensor is applied to a display panel, the display device includes a display panel including a display active area, a touch screen layer located on the surface of the display panel, including a sensing area, and connection electrodes and routing lines provided at the outer portion of the sensing area, wherein the connection electrodes and routing lines are formed of a metal having reflectivity of 10% or less, and a cover glass located above the touch screen layer, having an lower surface coated with a black printing material covering the outer portion of the sensing area.

25 Claims, 7 Drawing Sheets

DISPLAY DEVICE INTEGRATED WITH TOUCH PANEL

This application claims the benefit of Korean Patent Application No. 10-2011-0080355, filed on Aug. 11, 2011, which is hereby incorporated by reference in its entirety.

BACKGROUND OF THE INVENTION

1. Field of the Invention

The present invention relates to a touch screen, and more particularly, to a display device integrated with a touch screen in which resistance is reduced by forming a narrow bezel or increasing a routing margin through structure change of the outer portion of a sensing area in a structure in which a touch sensor is applied to a display panel.

2. Discussion of the Related Art

Recently, as the information age has arrived in earnest, a display field to visually express electric information signals has rapidly developed. In order to satisfy such a trend, various flat display devices having excellent performance, such as a thin profile, a light weight, and low power consumption, have been developed and have quickly replaced conventional cathode ray tubes.

As examples of the flat display devices, there are liquid crystal displays (LCDs), plasma display panels (PDPs), field emission displays (FEDs), and electroluminescent displays (ELDs). Each of these flat display devices essentially includes a flat display panel to form an image, and the flat display panel is configured such that a pair of transparent insulating substrates opposite to each other is bonded to each other while interposing a light emitting material layer or an optically anisotropic material layer therebetween.

A touch panel can recognize a touch point through a human hand or a separate input unit and can transmit information corresponding thereto, to the above display device. Recently, such a touch panel attached to an external surface of the display device is employed.

Touch panels are divided into a resistive type, a capacitive type, and an infrared sensing type depending on the touch sensing methods thereof. Due to the ease of a manufacturing method and sensing force, the capacitive type touch panel is of much interest at present.

A cover glass is provided on the upper surface of the above-described touch panel so as to protect the touch panel from physical impact applied from the outside. In this case, it is necessary to shield pad parts of the touch panel and routing lines connecting the pad parts to sensing electrodes. Therefore, the lower surface of the cover glass is coated with a black printing material, and when the cover glass is located on the upper surface of the touch panel, a designated margin is provided at the left and right sides of the touch panel due to an alignment error between the cover glass and the touch panel. However, an area corresponding to the black printing material, judged as a dead area of the touch panel, increases due to the margin. Further, the inner end of the black printing material and the innermost sides of the routing lines of the touch panel are separated in consideration of the alignment error, and such a separation area is judged as a dead area and thus increases a bezel area and thus formation of a narrow bezel is impossible.

SUMMARY OF THE INVENTION

The present invention is directed to a display device integrated with a touch screen.

One of the advantages of the present disclosure is to provide a display device integrated with a touch screen in which resistance is reduced by forming a narrow bezel or increasing a routing margin through structure change of the outer portion of a sensing area in a structure in which a touch sensor is applied to a display panel.

To achieve this advantage and other advantages and in accordance with one aspect of the invention, as embodied and broadly described herein, a display device integrated with a display screen may include a display panel including a display active area (A/A), a touch screen layer located on the surface of the display panel, including a sensing area and connection electrodes and routing lines at the outer portion of the sensing area, wherein the connection electrodes and routing lines are formed of a metal having reflectivity of 10% or less; and a cover glass located above the touch screen layer, having an lower surface coated with a black printing material covering the outer portion of the sensing area.

The connection electrodes and the routing lines may be formed of a stack structure including the metal having reflectivity of 10% or less and a first transparent electrode.

In some embodiments, the metal having reflectivity of 10% or less may be located as the upper portion of the stack structure forming the connection electrodes and the routing lines.

In further embodiments, the sensing area may coincide with the display active area or be separated outwardly from the display active area by 1 mm or less.

The metal having reflectivity of 10% or less may be CrOx. Further, the metal may be a metal having a light shielding property and low reflectivity.

The display device may further include a guide ring line formed on the touch screen layer to surround the outermost portion of the display panel.

The touch screen layer may be directly formed on the surface of the display panel. Otherwise, the display device may further include a sensor substrate located on the upper surface of the display panel, and the touch screen layer may be formed on the sensor substrate.

The sensor substrate may be formed of glass or a film.

The touch screen layer may further include, in the sensing area, first electrodes including first electrode patterns separated from each other in one direction and first connection patterns connecting the separated first electrode patterns in a different layer from a layer of the first electrode patterns, and second electrodes including second electrode patterns disposed in a direction intersecting with the first electrode patterns and second connection patterns formed integrally with the second electrode patterns and intersecting with the first connection patterns.

Here, the first electrode patterns, the second electrode patterns and the second connection patterns may be formed of a second transparent electrode of the same layer.

The first transparent electrode may be formed in the same layer as the first connection patterns.

Further, the black printing material may be located at the outside of the display active area.

A black matrix layer may be on the inner surface of the display panel at the outside of the edge of the display active area. Here, the display panel may further include first and second substrates opposite each other and a light emitting material or an optical isomer interposed between the first and second substrates.

In this case, the black matrix layer may be located on the lower surface of the second substrate.

The display device may further include a polarizing plate between the touch screen layer and the cover glass.

In another aspect of the present invention, a display device integrated with a touch screen includes a display panel including a display active area (A/A), a touch screen layer located on the surface of the display panel and including a sensing area separated outwardly from the display active area by 1 mm or less, and a cover glass located on the touch screen layer, and having an lower surface coated with a black printing material covering the outer portion of the sensing area. In some embodiments, the sensing area may directly coincide with the display active area.

A black dummy pattern covering the outer portion of the sensing area may be located on the touch screen layer.

In this case, a black matrix layer may be on the inner surface of the display panel at the outside of the edge of the display active area.

In some embodiments, the black matrix layer and the black dummy pattern may be formed of the same material.

In further embodiments, the black matrix layer and the black dummy pattern may have the same width.

The display device may further include a polarizing plate between the touch screen layer and the cover glass.

In this case, the black dummy pattern may be located on a surface of the polarizing plate opposite the touch screen layer.

The display panel may further include first and second substrates opposite each other and a light emitting material or an optical isomer interposed between the first and second substrates.

The black matrix layer may be located on the lower surface of the second substrate.

It is to be understood that both the foregoing general description and the following detailed description of the present invention are only exemplary and are intended to provide further explanation of the invention as claimed.

BRIEF DESCRIPTION OF THE DRAWINGS

The accompanying drawings are included to provide a further understanding of the invention and are incorporated in and constitute a part of this application. The drawings illustrate embodiment(s) of the invention and together with the description serve to explain the principle of the invention. In the drawings.

DETAILED DESCRIPTION OF THE INVENTION

Reference will now be made in detail to the specific embodiments of the present invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the present invention.

Figure 1:
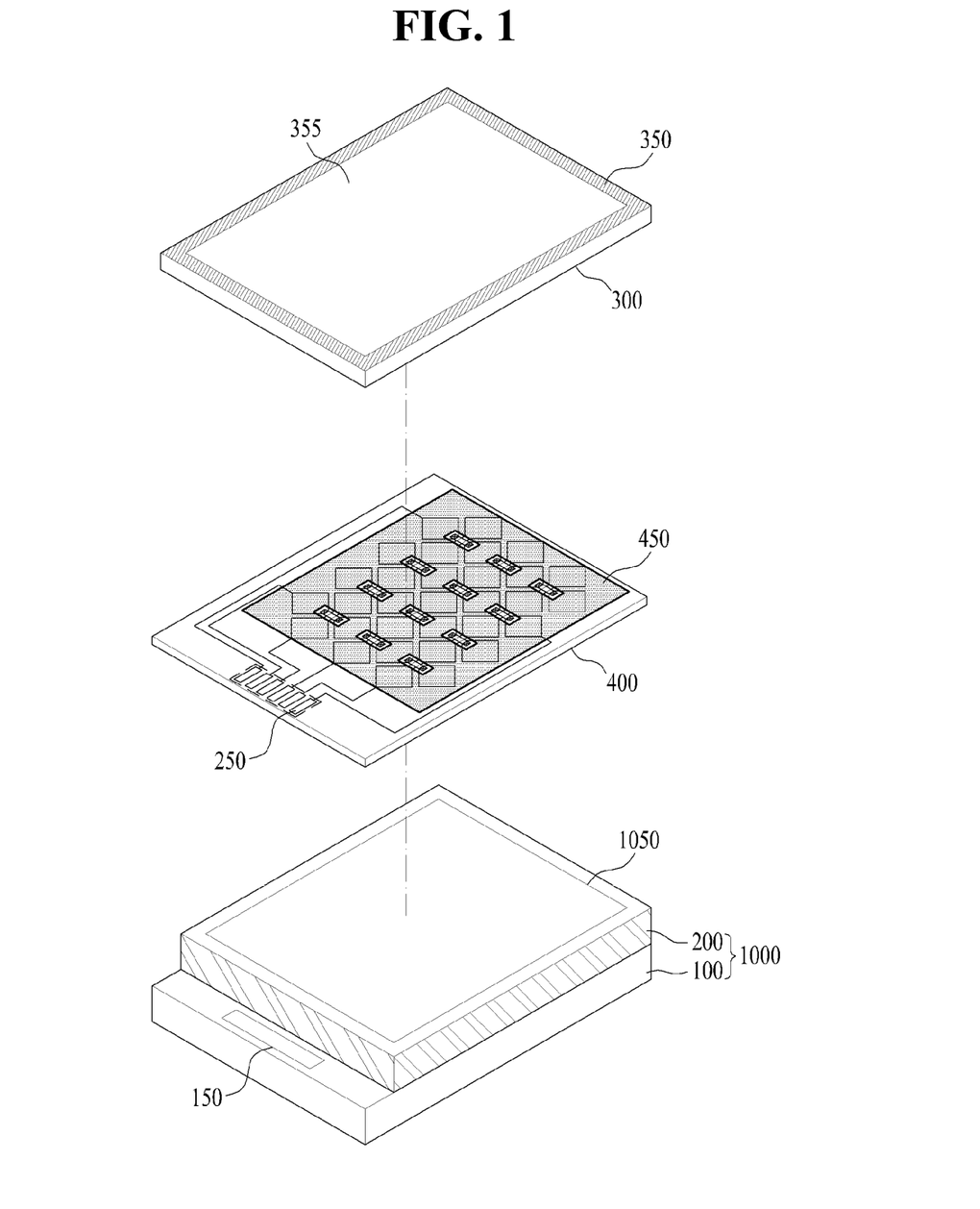
FIG. 1 is an exploded perspective view of an exemplary display device integrated with a touch screen in accordance with some embodiments of the present invention.
Figure 2:
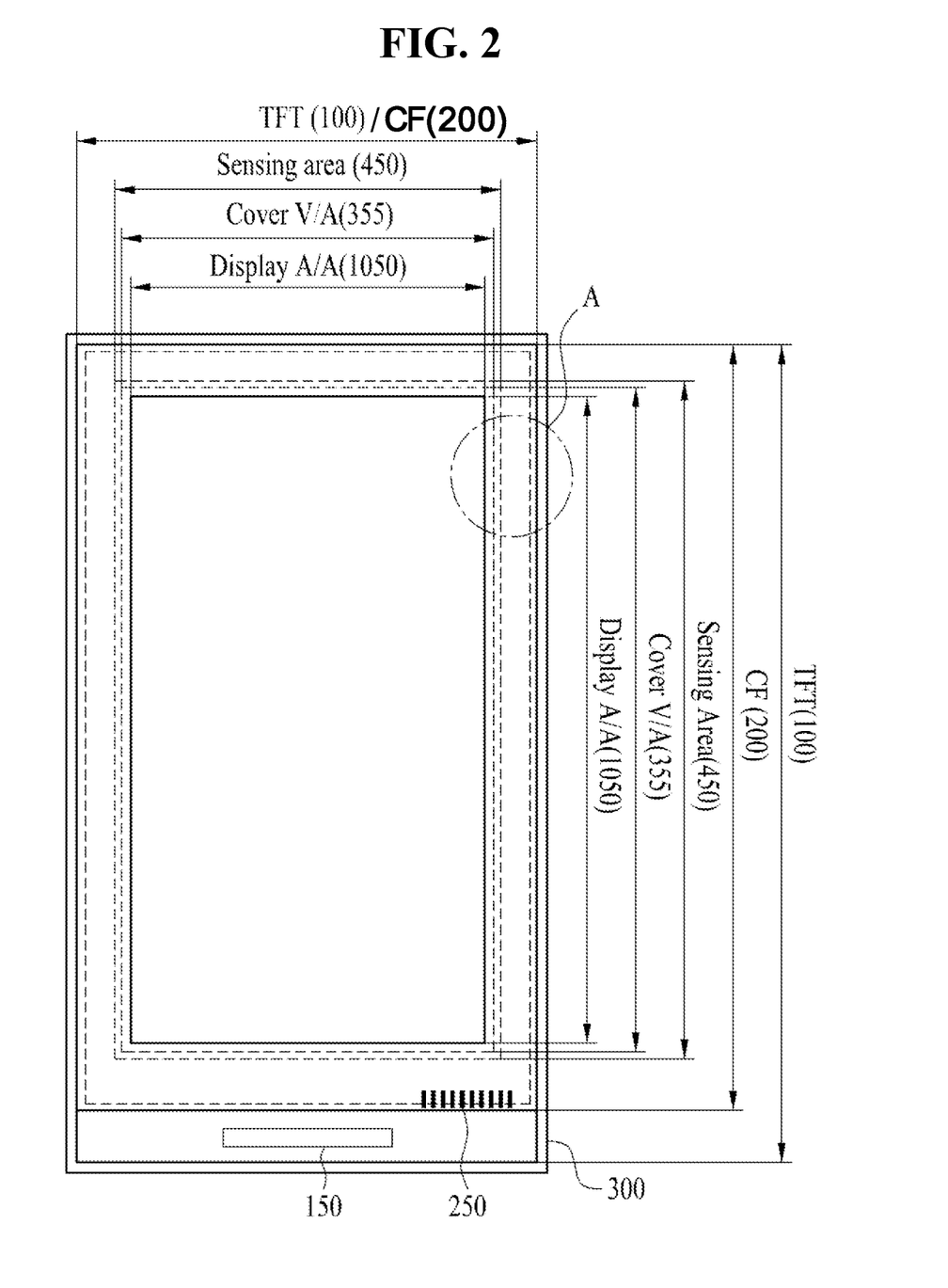
FIG. 2 is a plan view of the exemplary display device in accordance with additional embodiments of the present invention.
Figure 3:
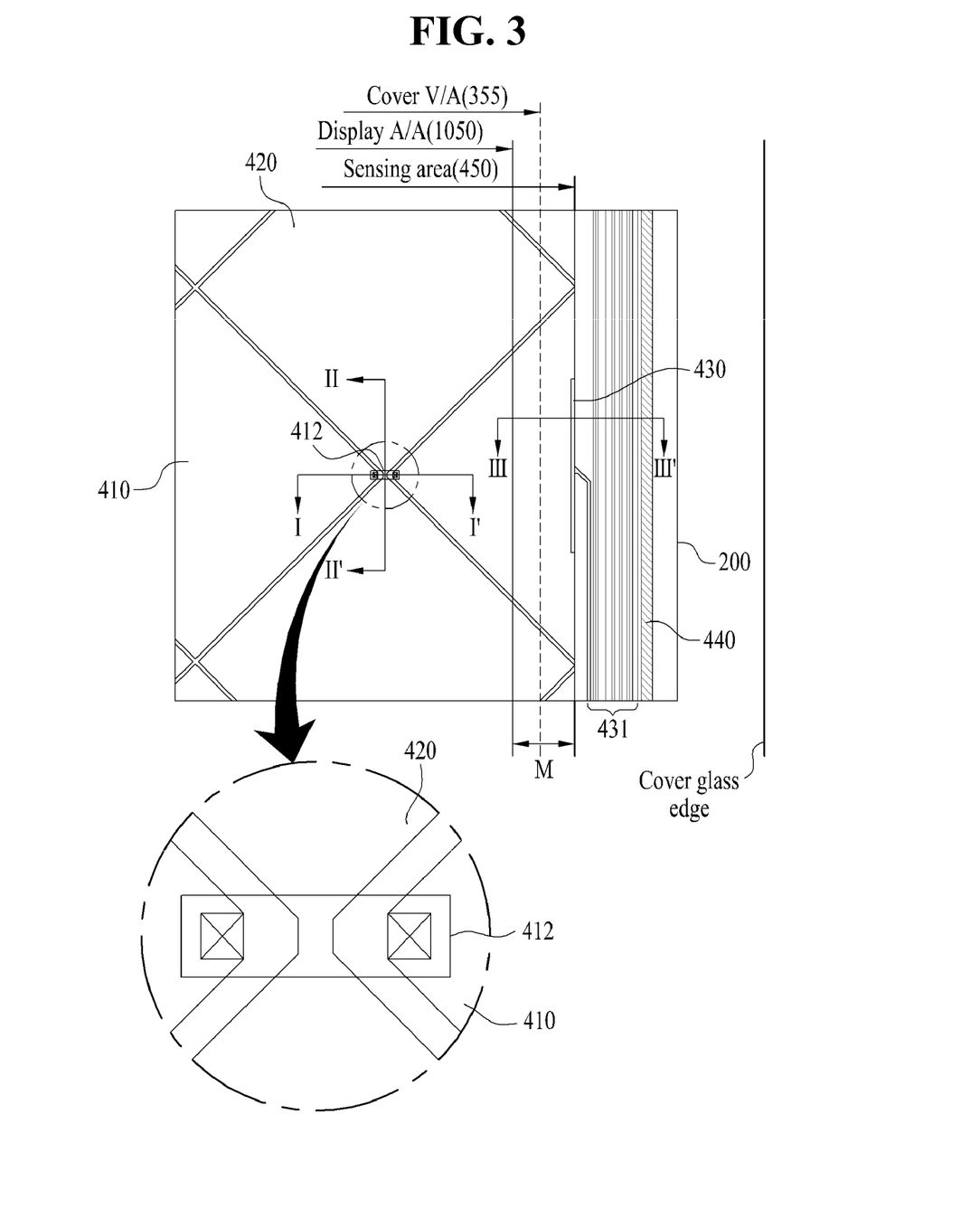
FIG. 3 is an enlarged view of the region A of FIG. 2.

FIG. 1 is an exploded perspective view of an exemplary display device integrated with a touch screen in accordance with some embodiments of the present invention, FIG. 2 is a plan view of the exemplary display device, and FIG. 3 is an enlarged view of the region A of FIG. 2.

As shown in FIGS. 1-3, an exemplary display device integrated with a touch screen includes a display panel 1000, a touch screen layer 400 located on the display panel 1000, and a cover glass 300 covering the display panel 1000 and the touch screen layer 400.

The display panel 1000 may be a flat display panel, including first and second substrates opposite to each other, and a light emitting material or an optical isomer interposed between the first and second substrates.

For example, the display panel 1000 may be an organic light emitting display panel, a liquid crystal display panel, an electrophoretic display panel, a quantum dot display panel or a plasma display panel. The display panel 1000 shown in FIGS. 1 and 2 according to some embodiments of the present invention is a liquid crystal display panel, including first and second substrates 100 and 200 and a liquid crystal layer (not shown) filling a space formed therebetween. Further, the first and second substrates 100 and 200 may include a thin film transistor array and a color filter array, respectively.

One end of the first substrate 100 may protrude outwardly relative to the second substrate 200. This protrusion may serve to define a display panel pad to drive the thin film transistor array and a display panel drive unit 150 including the display panel pad. Here, a display active area (A/A) 1050 of the display panel 1000 is defined as an inner area which is separated inwardly from the edge of the display panel 1000 by a designated width. A black matrix layer 210 (FIGS. 6-9) is formed on the second substrate 200 at the outside of the display A/A 1050.

The touch screen layer 400 may include a sensor array that may be formed directly on the surface of the upper substrate 200 of the display panel 1000 or may be formed on the upper surface of an additional sensor substrate (not shown in figures) on the upper substrate 200. In the case of the former where a sensor array is formed on the second substrate 200, the second substrate 200 is turned over, a color filter array is formed on the second substrate 200, and a thin film transistor array is formed on the first substrate 100. Then, a liquid crystal layer is formed between the first and second substrates 100 and 200, which are bonded to produce the display panel 1000. In the case of the latter where a sensor array is formed on an additional sensor substrate, the sensor array is attached to the display panel 1000 by interposing an adhesive layer (not shown) therebetween.

In a touch screen layer 400 according to some embodiments of the present invention, a sensing area 450 in which sensing electrodes are formed to execute touch sensing is defined as an inner area which is separated inwardly from the edge of the second substrate 200 or the additional sensor substrate by a designated width.

The cover glass 300 may be located at the outermost portion of the display device, may serve as a display surface which a user directly touches, and may have a size to completely cover the display panel 100 and the touch screen 400. Thus, in some embodiments, the cover glass 300 may be covering the entire area of the display panel 1000 and the touch screen layer 400.

In some embodiments, the cover glass 300 is coated with a sufficient amount of a black printing material 350 to cover the outer portion of the sensing area 450 of the touch screen layer 400 by a designated width from the edge of the cover glass 300. As used herein, the "black printing material" refers to a printing material of any color that does not pass any light through the printing material. In some embodiments, the black printing material may be the same material as the material used to form the black dummy pattern and/or the black matrix layer described herein. Thereby, an area of the cover glass 300 at the inside of the area of the cover glass 300 coated with the black printing material 350 is a transparent area which transmits an image from the lower part, thus being referred to as a cover viewing area (V/A) 355.

Hereinafter, the display A/A 1050 of the display panel 1000, the sensing area 450 of the touch screen layer 400, and the cover V/A 355 of the cover glass 300 will be described in more detail with reference to FIG. 2.

As shown in FIG. 2, according to additional embodiments of the invention, the display A/A 1050 is defined as the innermost area, the sensing area 450 of the touch screen layer 400 is defined as the outermost area, and the cover V/A area 355 is defined as an area between the display A/A 1050 and the sensing area 450. However, in yet additional embodiments, the sensing area 450 may nearly or directly coincide with the display A/A 1050 or be adjacent to the display A/A 1050. Thus, a narrow bezel or a line formation area at the outer portion of the sensing area 450 may be sufficiently obtained, thereby improving resistive-capacitive (RC) delay. In this case, although the lines located at the outer portion of the sensing area 450 intrude into the cover V/A 355 and are thus exposed to the cover V/A 355, viewing of the lines at the outer portion of the sensing area 355 may be prevented due to components of the lines or application of an additional configuration.

FIG. 2 illustrates an exemplary structure in which the touch sensor array forming the touch screen layer 400 is directly formed on the surface of the second substrate 200 without an additional sensor substrate. However, the display device is not limited to this structure, and the above-described definitions of the respective areas may be applied to a structure requiring a touch sensor array on an additional sensor substrate, including, but not limited to, glass substrate and insulating film, for example, a plastic film. If an additional sensor substrate, is required, the touch screen layer 400 is located on the upper surface of the additional sensor substrate, and the surface of the sensor substrate without the touch screen layer 400 faces the display panel 1000.

In the case of the structure in which the touch screen 400 is formed on the second substrate 200 without the additional sensor substrate, a polarizing plate 260 (with reference to FIGS. 6A to 8) is disposed to cover the touch screen layer 400, and then the cover glass 300 is located thereon. In the case of the structure in which the touch screen layer 400 is provided with the additional sensor substrate, the polarizing plate 260 is disposed on the rear surface of the second substrate 200, and then the touch screen layer 400 provided with the sensor substrate is located thereon.

Also referring to FIG. 2, a touch sensing drive unit 250 may be located at the outer portion of the sensing area 450.

A black matrix layer 210 (FIGS. 6A-9B) may be located on the lower surface of the second substrate 200 outside of the display A/A 1050, as shown in FIGS. 6A-9B, thereby preventing light leakage. As used herein, "a black matrix layer" includes a matrix layer that does not pass any light through the layer.

Hereinafter, a display device integrated with a touch screen in accordance with each of embodiments of the present invention will be described.

Figure 4:
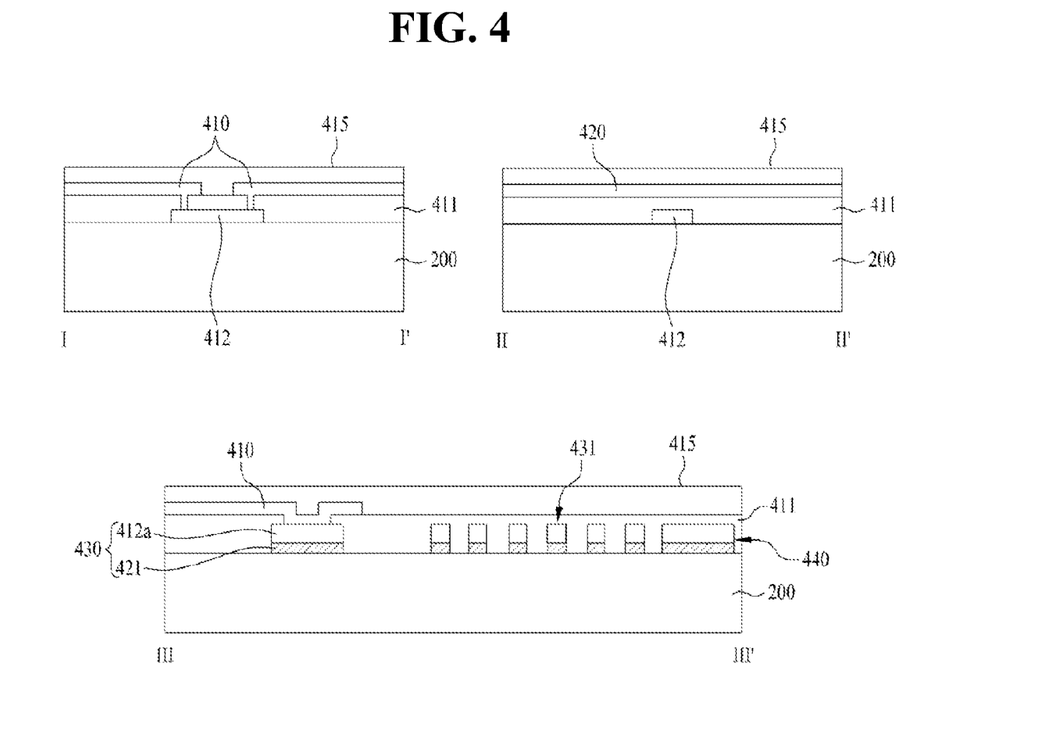
FIG. 4 illustrates sectional views taken along the lines I~I', II~II' and III~III' of FIG. 3.

FIG. 4 is sectional views taken along the lines I~I', II~II' and III~III' of FIG. 3 in accordance with some embodiments of the present invention.

As shown in FIG. 3 and FIG. 4, in some embodiments, first electrodes (electrodes in the X-axis direction) and second electrodes (electrodes in the Y-axis direction) intersecting with each other are formed on the touch screen layer formed on the second substrate 200, and these electrodes are connected to connection electrodes 430 at the ends of respective rows and columns. In further embodiments, the first and second electrodes are connected to routing lines 431 formed at the outer portion of the sensing area of the connection electrodes 430 and are connected to the touch sensing drive unit 250 (with reference to FIG. 2) located on one side of the second substrate 200, and thus signals are applied to the respective electrodes, and the signals from the respective electrodes are detected.

In one aspect of the present invention, the first electrodes and the second electrodes intersecting with each other in rows and columns are formed in the sensing area. The first electrodes may include (i) a plurality of diamond-shaped first electrode patterns 410 formed in the row direction (the X-axis direction) and (ii) first connection patterns 412 connecting the neighboring first electrode patterns 410 to electrodes in another layer. Thus, signals may be transmitted to the first electrodes in the horizontal direction. The second electrodes may include (i) a plurality of diamond-shape second electrodes patterns 420 formed in the column direction (the Y-axis direction) and (ii) second connection patterns (integrated with the second electrode patterns 420) connecting the neighboring second electrode patterns 420.

In some embodiments, the first electrode patterns 410 and the second electrode patterns 420 are transparent electrodes formed in the same layer.

In further embodiments, the first connection patterns 412 are formed of a metal or a transparent electrode provided as a layer differing from the layers of the first electrode patterns 410 and the second electrode patterns 420.

Here, the transparent electrodes may be formed of a material, such as indium thin oxide (ITO), indium zinc oxide (IZO), indium tin zinc oxide (ITZO) and antimony tin oxide (ATO). This serves to prevent obstruction to transmission of an image to the display panel located thereunder.

In some embodiments, the plural first electrodes in which the first electrode patterns 410 and the first connection patterns 412 are formed are disposed in parallel in the row direction, and the plural second electrodes in which the second electrode patterns 420 integrated with the second connection patterns are formed are disposed in parallel in the column direction, thereby being capable of detecting various positions of the sensing area.

Here, one of the first electrode patterns 410 or the second electrode patterns 420 may have a size smaller than one touch region, for example, 1 cm$^2$ which is approximately an area touched by one finger, and may have a diagonal length of 1 to 7 mm.

In further embodiments, the connection terminals 430 are formed at the ends of the first electrode patterns 410 and the second electrode patterns 420, and the connection terminals 430 are connected to a touch sensing drive unit including respective corresponding pad electrodes through the routing lines 431.

The pad electrodes of the touch sensing drive unit may be connected to a flexible printed circuit (FPC), and may receive control signals corresponding to the first and second electrodes from a touch controller provided on the FPC.

The connection electrodes 430 overlap the first electrode patterns 410 and the second electrode patterns 420, and are connected to the routing lines 431. In some embodiments, the connection electrodes 430 may be formed of a metal in the same layer as the routing lines 431 and the pad electrodes.

The connection electrodes 430 and the routing lines 431 are formed at the outer region of the sensing area 450. In some embodiments, a guide ring line 440 is formed at the edge of the outer region (i.e., at the outer portion of the outermost routing line 431), and a ground voltage signal or a DC voltage signal of a designated value may be applied to the guide ring line 440 to interrupt external static electricity.

Hereinafter, the touch screen layer of the display device in accordance with additional embodiments of the present invention will be described with reference to FIG. 4.

The connection electrodes 430, the routing lines 431 and the guide ring line 440 formed at the outer portion of the sensing area on the second substrate 200 may be formed of a double layer including a low reflectivity metal 421, such as CrOx, and a transparent electrode 412a.

In one aspect of the present invention, the transparent electrode 412a is formed of a material formed in the same layer with the first connection patterns 412. If the material of the first connection patterns 412 is replaced with a metal having high conductivity, the material of the transparent electrode 412a may be replaced with the metal. In this case, the connection electrodes 430, the routing lines 431 and the guide ring line 440 may be formed of a double layer including the low reflectivity metal 421 and a high conductivity metal 412a.

The low reflectivity metal 421 is may be, for example, a metal having reflectivity of 10% or less, and may be a metal having a light shielding property higher than a reflecting property. Here, the low reflectivity metal 421 instead of CrOx, having reflectivity of 10% or less may allow the connection electrodes 430 and the routing lines 431 to be invisible even when the connection electrodes 430 and the routing lines 431 intrude into the black printing material 350.

When the first connection patterns 412 are formed of a transparent electrode, the first connection patterns 412 may be invisible in the sensing area. If a separation distance among the first electrode patterns 410 is sufficiently narrow, the risk of visibility of the first connection patterns 412 is low, although the first connection patterns 412 are formed of a metal. Accordingly, the first connection patterns 412 may be formed of the above-described high conductivity metal without the risk of being visible, reducing resistance and reception sensibility at the first electrodes.

In another aspect of the invention, the connection electrodes 430 are connected to the first electrodes 410 overlapping the upper surface of the connection electrodes 430 by interposing a first insulating film 411 therebetween, and the first insulating film 411 covers the connection electrodes 430, the routing lines 431 and the guide ring line 440.

The second electrodes are formed in the same layer as the first electrodes, and the first electrodes and the second electrodes are located in the first insulating film 411.

Further, a second insulating film 415 covering the first electrodes and the second electrodes may be provided. According to circumstances, the second insulating film 415 may be omitted.

In the display device in accordance with some embodiment of the present invention, electrodes (the connection electrodes, the routing lines and the guide ring line) formed at the outer portion of the sensing area are formed of a metal having low reflectivity, and the surfaces of the electrodes do not reflect light even if these regions are not covered by the black print material on the lower surface of the cover glass, thereby solving a visibility problem.

Therefore, in the structure in which the innermost display A/A and the outermost sensing area are disposed, the sensing area may be disposed to coincide with the display A/A or to be nearly or directly adjacent to the display A/A, thereby reducing the bezel area at the outer portion of the sensing area. In this case, the maximum separation distance (M as shown in FIG. 3) between the display A/A 1050 and the sensing area 450 is within 1 mm. In additional embodiments, the separation distance (M) between the display A/A 1050 and the sensing area 450 may be 1 mm, 0.7 mm, 0.5 mm, 0.3 mm, 0.1 mm, 0.01 mm, or zero. If the display A/A and the sensing area are separated from each other, the edge of the sensing area is located at the outside of the display A/A.

Further, since the connection electrodes and the routing lines having low reflectivity may be disposed at the inside of the black printing material formed on the lower surface of the cover glass, a separation space between the electrodes at the outer portion of the sensing region may be increased, and resistance and parasitic capacitance may be reduced, also reducing signal delay. Additionally, if a space is scarcely present between the display A/A and the edge of the sensing area, when a space of the outside of the sensing area is increased, a larger number of the routing lines may be disposed, and thus the routing lines may be disposed even in a large size model without increase of the bezel area.

A manufacturing method of the display device in accordance with the above-described embodiments sequentially may include patterning a low reflectivity metal, patterning a first transparent electrode to form the first connection patterns, patterning the first insulating film, and patterning a second transparent electrode to form the first and second electrodes, thereby using 4 masks or less in total. In this case, the patterning of the low reflectivity metal and the patterning of the first transparent electrode may be interchanged.

Figure 5:
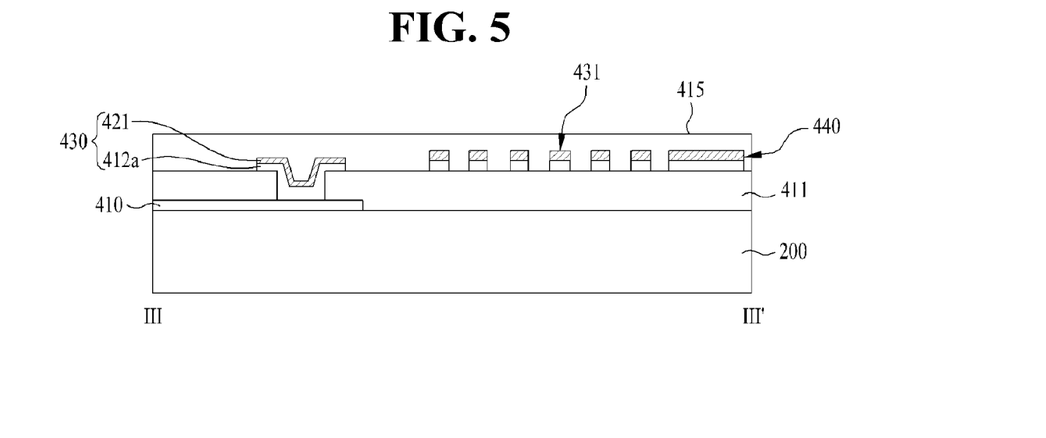
FIG. 5 is a sectional view taken along the line III~III' of FIG. 3 in accordance with further embodiments of the present invention.

FIG. 5 is a sectional view taken along the line III~III' of FIG. 3 in accordance with other embodiments of the present invention.

These embodiments of the present invention differ from the previously described embodiments in that the second and fourth mask processes are respectively interchanged with the third and first mask processes, and that the mask process to pattern the low reflectivity metal is lastly carried out in these embodiments.

In some embodiments, a manufacturing method of the display device may sequentially include patterning a first transparent electrode to form the first and second electrodes, patterning the first insulating film 411, and patterning a second transparent electrode to form the first connection patterns 412.

Here, the connection electrodes 430, the routing lines 431 and the guide ring line 440 are formed of a double layer including a second transparent electrode 412a forming the first connection patterns 412 and a low reflectivity metal 421.

In this case, since the low reflectivity metal 421 may be located on the uppermost region at the outer portion of the sensing area without an insulating film, such a region is not visible to the outside due to the light shielding properties thereof even if the region is exposed from the black printing material formed on the lower surface of the cover glass.

Hereinafter, effects of the display device in accordance with the embodiments of the present invention will be described with reference to the accompanying drawings.

Figure 6A:
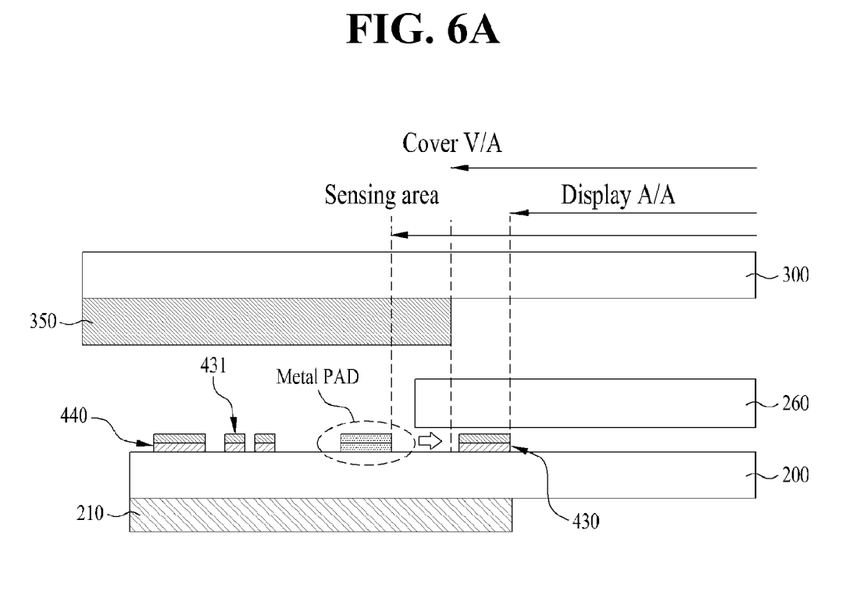
FIGS. 6A and 6B are sectional views illustrating a first effect when the touch screen in the exemplary display is applied.
Figure 6B:
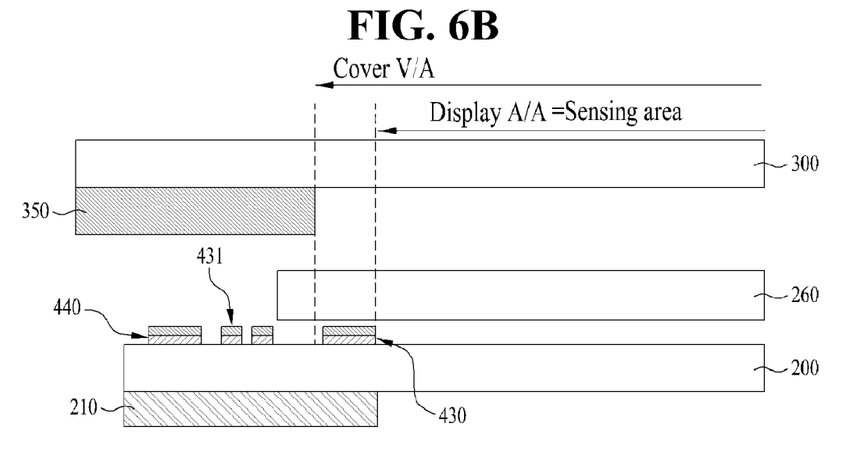
Figure 7:
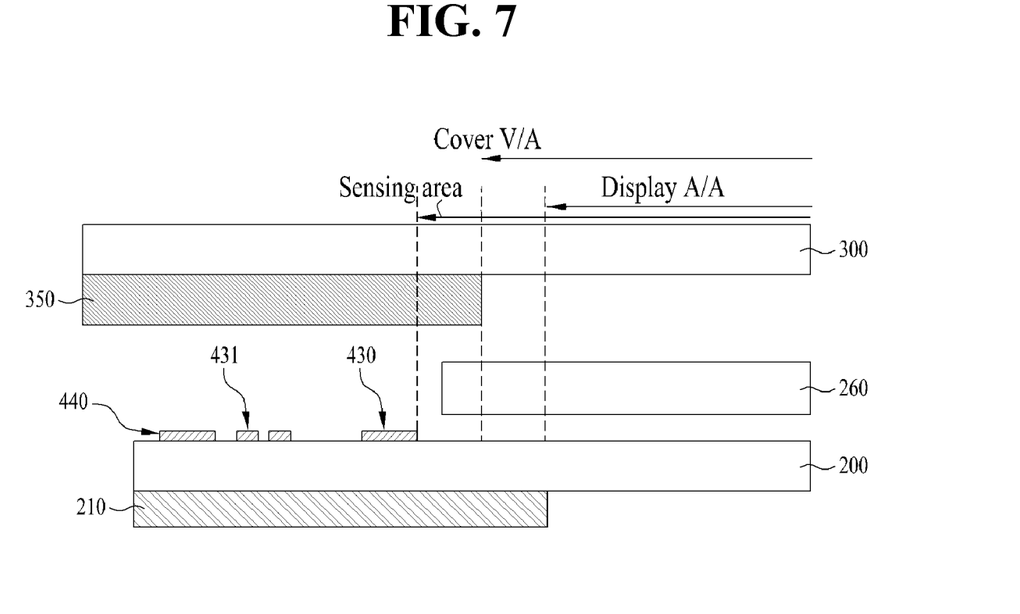
FIG. 7 is a sectional view compared to the touch screen in the exemplary display.

FIGS. 6A and 6B are sectional views illustrating a first effect when the touch screen in accordance with some embodiments of the present invention is used, and FIG. 7 is a sectional view compared to the touch screen in accordance with additional embodiments of the present invention.

Through comparing FIGS. 6A, 6B and 7, it can be shown that when the display A/A and the edge of the sensing area nearly or directly coincide with each other, a space therebetween may be reduced, and thus a dead area may be reduced to produce a narrow bezel effect.

That is, an area located at the outer portion of the display device (i.e., a bezel) is reduced, and thus an effective visible area in the display panel having the same size as sensing area 450 may be increased.

As shown in FIGS. 6A and 6B, even if the connection electrodes 430 and the routing lines 431 including the low reflectivity metal intrude into the black printing material 350 located at the outer portion of the cover glass 300, a region at which the corresponding electrodes including the low reflectivity metal are located may not be visible.

Although the connection electrodes 430, the routing lines 431 and the guide ring line 440 may be formed of a double layer including the transparent electrode 412a and the low reflectivity metal 421, as described above, the connection electrodes 430, the routing lines 431 and the guide ring line 440 may also be formed of a single layer including the low reflectivity metal 421, according to circumstances.

Figure 8:
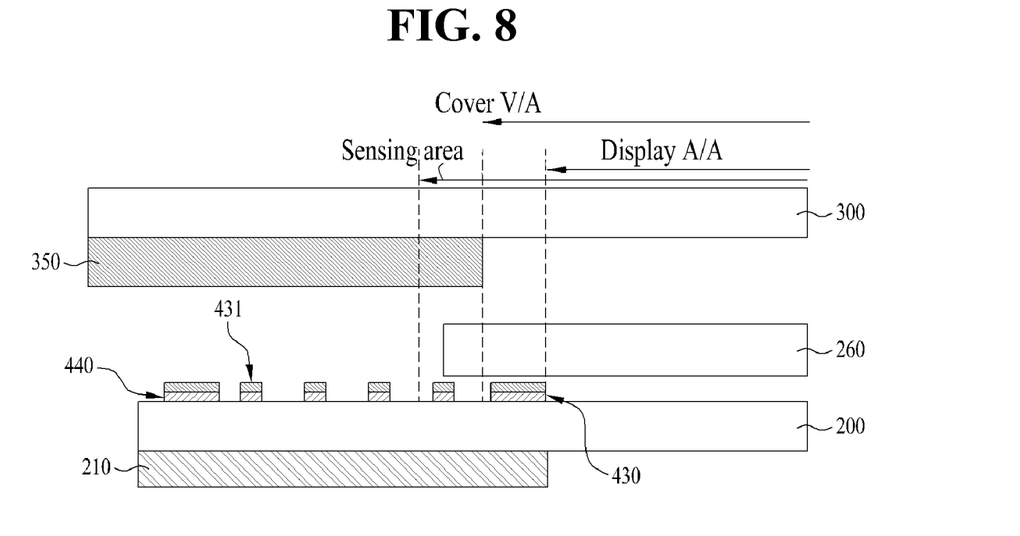
FIG. 8 is a sectional view illustrating a second effect when the touch screen in the exemplary display is applied.

FIG. 8 is a sectional view illustrating a second effect when the touch screen in accordance with additional embodiments of the present invention is applied.

As shown in FIG. 8, when the touch screen in accordance with the present invention is applied, the connection electrodes 430, the routing lines 431, etc. may be formed adjacent to the edge of the display A/A if the same bezel area is required. In this case where there is more space between the guide ring line 440 and the connection electrodes 430 as shown in FIG. 8, RC delay may be reduced by increasing the separation distance between the routing lines 431. RC delay may also be reduced by increasing the number of the routing lines 431. If the number of the routing lines 431 is increased in a large size model, a larger number of the routing lines 431 may be formed within the outer portion of the sensing area in the same structure, and thus the touch screen may be designed without increase of the outer portion of the sensing area in the large size model having a larger number of the routing lines 431.

Figure 9A:
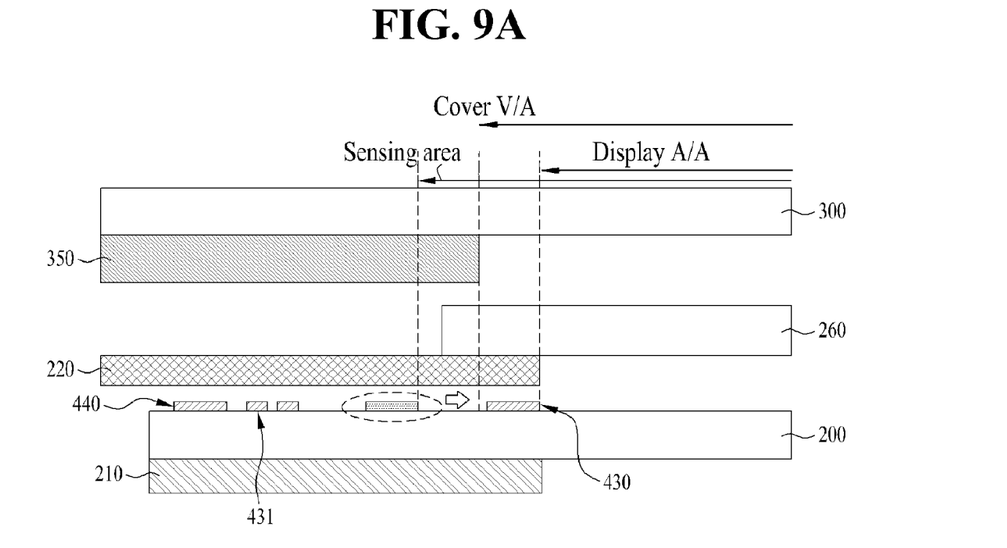
FIGS. 9A and 9B depict sectional views of a display device integrated with a touch screen in accordance with additional embodiments of the present invention.
Figure 9B:
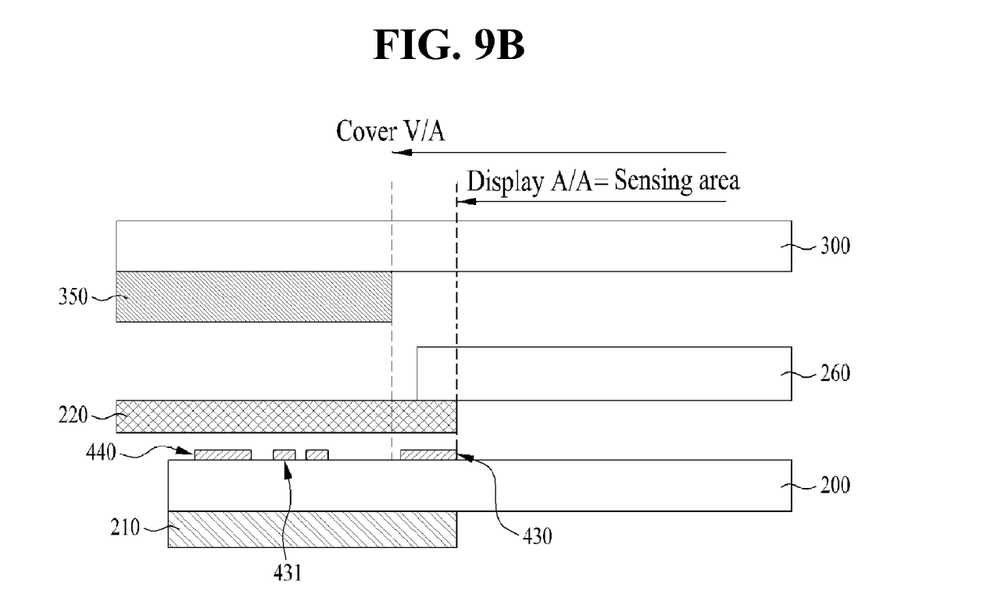

FIGS. 9A and 9B illustrate sectional views of some embodiments of a display device integrated with a touch screen described herein.

As shown in FIGS. 9A and 9B, the display device in accordance with additional embodiment of the present invention may further include a black dummy pattern 220 provided on the touch screen corresponding to the black matrix layer 210 at the outer portion of the lower surface of the second substrate 200. In particular, FIG. 9B depicts an embodiment in which the lines at the outer portion of the sensing area coincide directly adjacent to the edge of the display A/A. As used herein, the "black dummy pattern" refers to a dummy pattern of any color that does not pass any light through the pattern.

In this case, the black dummy pattern 220 may be formed of the same material as the black matrix layer 210, and may prevent reflection generated due to disposition of a metal at the outer portion of the sensing area. In this case, the black dummy pattern 220 may be formed of the same material as the black matrix layer 210 to remove a color difference between the black dummy pattern 220 and the black matrix layer 210 and to prevent the black dummy pattern 220 from being visible even if the black dummy pattern 220 is located inside of the black printing material 350.

In further embodiments, the black dummy pattern 220 may protrude outwardly from the lower surface of the polarizing plate 260 disposed on the touch screen layer to cover the outer portion of the sensing area, or be formed on the upper surface of the second insulating film 415 (with reference to FIGS. 4 and 5) which is the uppermost layer of the touch screen layer. The latter structure may be more advantageous to prevent misalignment when the polarizing plate 260 is attached to the touch screen layer.

The above-described display device integrated with the touch screen in accordance with some embodiments of the present invention may have the following effects.

If a touch screen layer is implemented in an on-cell type or an add-on type, although lines are located to intrude into a black printing material of a cover glass, the lines may include a low reflectivity metal or a black dummy pattern covering the outer portion of a sensing area of the touch screen layer, thereby preventing the lines at the outer portion of the sensing area from being visible.

Therefore, the lines at the outer portion of the sensing area may coincide with the edge of a display A/A or be nearly or directly adjacent to the edge of the display A/A regardless of an area of the cover glass coated with the black printing material, and thus a separation space between the display A/A and the sensing area may be reduced, resulting in a narrow bezel. Otherwise, if the same bezel area is maintained, the outer portion of the sensing area increases in proportion to increase of the sensing area by the edge of the display A/A, increasing the distance between areas where routing lines are formed or between areas where guide ring lines are formed, and thereby reducing resistance and parasitic capacitance at the outer portion of the sensing area. Further, under the condition where the number of the routing lines is increased corresponding to a large size model, a separation distance between the sensing area and the display A/A is reduced, and a space for the routing lines is further increased in proportion to the reduced separation distance, disposing the lines without increasing an additional bezel area even in the large size model.

It will be apparent to those skilled in the art that various modified embodiments and variations can be made in the present invention without departing from the spirit or scope of the inventions. Thus, it is intended that the present invention covers the modified embodiments and variations of this invention provided they come within the scope of the appended claims and their equivalents.

What is claimed is:

1. A display device integrated with a touch screen, comprising:
    a display panel comprising a display active area, wherein the display panel includes first and second substrates opposite each other and a light emitting material or an optical isomer interposed between the first and second substrates;
    a touch screen layer located on the surface of the display panel, the touch screen layer comprising a sensing area separated outwardly from the display active area by 1 mm or less, and connection electrodes and routing lines at the outer portion of the sensing area, wherein the connection electrodes and the routing lines are formed of a metal having reflectivity of 10% or less;
a cover glass located above the touch screen layer, having a lower surface coated with a black printing material covering the outer portion of the sensing area; and
a black matrix layer is on an inner surface of the second substrate at the outside of the edge of the display active area.

2. The display device according to claim 1, wherein the connection electrodes and the routing lines are formed of a stack structure comprising the metal having reflectivity of 10% or less and a first transparent electrode.

3. The display device according to claim 2, wherein the metal having reflectivity of 10% or less is located as the upper portion of the stack structure forming the connection electrodes and the routing lines.

4. The display device according to claim 1, wherein the metal having reflectivity of 10% or less is CrOx.

5. The display device according to claim 1, further comprising a guide ring line formed on the touch screen layer to surround the outermost portion of the display panel.

6. The display device according to claim 1, wherein the touch screen layer is directly formed on the surface of the display panel.

7. The display device according to claim 1, further comprising a sensor substrate located on the upper surface of the display panel, wherein the touch screen layer is formed on the sensor substrate.

8. The display device according to claim 7, wherein the sensor substrate is formed of glass or a film.

9. The display device according to claim 2, wherein the touch screen layer further comprises, in the sensing area:
first electrodes comprising first electrode patterns separated from each other in one direction and first connection patterns connecting the separated first electrode patterns in a different layer from the first electrode patterns; and
second electrodes comprising (i) second electrode patterns disposed in a direction intersecting with the first electrode patterns and (ii) second connection patterns formed integrally with the second electrode patterns and intersecting with the first connection patterns.

10. The display device according to claim 9, wherein the first electrode patterns, the second electrode patterns and the second connection patterns are formed of a second transparent electrode of the same layer.

11. The display device according to claim 2, wherein the first transparent electrode is formed in the same layer as the first connection patterns.

12. The display device according to claim 1, wherein the black printing material is located at the outside of the display active area.

13. The display device according to claim 1, further comprising a polarizing plate between the touch screen layer and the cover glass.

14. A display device integrated with a touch screen, comprising:
a display panel comprising a display active area, wherein the display panel includes first and second substrates opposite each other and a light emitting material or an optical isomer interposed between the first and second substrates;
a touch screen layer located on the surface of the display panel, the touch screen layer comprising a sensing area separated outwardly from the display active area by 1 mm or less;
a cover glass located above the touch screen layer, having an lower surface coated with a black printing material covering the outer portion of the sensing area; and
a black matrix layer is on an inner surface of the second substrate at the outside of the edge of the display active area.

15. The display device according to claim 14, wherein the sensing area directly coincides with the display active area.

16. The display device according to claim 14, wherein a black dummy pattern covering the outer portion of the sensing area is located on the touch screen layer.

17. The display device according to claim 16, wherein the black matrix layer and the black dummy pattern are formed of the same material.

18. The display device according to claim 16, wherein the black matrix layer and the black dummy pattern have the same width.

19. The display device according to claim 16, further comprising a polarizing plate between the touch screen layer and the cover glass.

20. The display device according to claim 19, wherein the black dummy pattern is located on a surface of the polarizing plate opposite the touch screen layer.

21. The display device according to claim 14, further comprising a guide ring line on the touch screen layer to surround the outermost portion of the display panel.

22. The display device according to claim 14, wherein the touch screen layer is directly formed on the surface of the display panel.

23. The display device according to claim 14, further comprising a sensor substrate located on the upper surface of the display panel, wherein the touch screen layer is formed on the sensor substrate.

24. The display device according to claim 23, wherein the sensor substrate is formed of glass or a film.

25. The display device according to claim 14, wherein the touch screen layer further comprises, in the sensing area:
first electrodes comprising first electrode patterns separated from each other in one direction and first connection patterns connecting the separated first electrode patterns in a different layer from a layer of the first electrode patterns; and
second electrodes comprising (i) second electrode patterns disposed in a direction intersecting with the first electrode patterns and (ii) second connection patterns formed integrally with the second electrode patterns and intersecting with the first connection patterns.

* * * * *